United States Patent [19] [11] 4,403,902
Sapelak [45] Sep. 13, 1983

[54] MEANS FOR CONVERTING A GRAPPLE SKIDDER TO A CABLE SKIDDER

[75] Inventor: Ronald Sapelak, Belmont, Canada

[73] Assignee: Clark Equipment Company, Buchanan, Mich.

[21] Appl. No.: 342,862

[22] Filed: Jan. 26, 1982

[51] Int. Cl.³ .............................................. B66B 1/42
[52] U.S. Cl. .................................... 414/569; 414/786; 414/912
[58] Field of Search ................ 414/912, 734, 569, 786

[56] References Cited

U.S. PATENT DOCUMENTS 3,281,119 10/1966 Westfall .............................. 414/569
4,102,528 7/1978 Cripe ............................... 414/569 X
4,315,652 2/1982 Barwise ........................... 414/569 X Primary Examiner—Robert J. Spar
Assistant Examiner—Donald W. Underwood
Attorney, Agent, or Firm—Harry G. Thibault

[57] ABSTRACT

An improved boom grapple assembly which enables a skidder operator to easily transform the boom grapple assembly from a grapple skidder mode of operation to a cable skidder mode of operation and back again.

7 Claims, 4 Drawing Figures

MEANS FOR CONVERTING A GRAPPLE SKIDDER TO A CABLE SKIDDER

BACKGROUND OF THE INVENTION

1. Field of the Invention

This invention pertains to an improved grapple boom configuration for a skidder and in particular a grapple boom configuration that is adaptable for multiple usages without disassembly and specifically, a grapple boom configuration which allows the skidder to be used as a grapple skidder, and, when the grapple is pinned to the upper end of the boom out of the way of the winch and cable, as a cable skidder.

2. History of the Prior Art

Typically, a skidder vehicle is designed for operation in two modes. As a cable skidder, the vehicle plays out a length of cable from a winch attached to a skidder boom. A number of shorter choker cables attached to the outer end of the cable may, in turn, be secured to individual logs. A plurality of logs may then be dragged up a slope or out of the woods into a cleared area by activating the winch to draw up the cable. After a number of logs have been gathered into piles of three to six logs each, the cable skidder can then be converted to a grapple skidder wherein a grapple mechanism is mounted on the boom in pivotable engagement therewith for gathering individual groups of logs to a central location.

In the typical example of the prior art, once the logs are gathered by the grapple skidder, the grapple mechanism must again be detached from the boom so that the skidder vehicle may again operate as a cable skidder. In some cases the cable skidding boom and the grapple skidding boom are different and in other cases the same boom is used in both the cable skidding and the grapple skidding mode of operation but a separate grapple mechanism must be attached to the boom before the skidder vehicle can operate as a grapple skidder. The present invention offers an improved grapple boom configuration which permits the grapple to be rotated out of the way when it is desired that the skidder vehicle be operated as a cable skidder. The grapple is retained in an out-of-the-way position by engaging the grapple arms above and atop the boom arms and securing the upper end of the grapple and the upper end of the boom in pinned relationship.

SUMMARY OF THE INVENTION

The improved grapple boom assembly comprises a base support structure having a pair of columns which converge upwardly in an A-frame configuration. The bottom of each column is pinned to the rear of the skidder frame on opposite sides thereof and adjacent respective fenders at the inner walls thereof. A pair of horizontally extending hydraulic cylinders are connected to respective mid-portions of the columns for raising and lowering the boom. The boom columns converge upwardly and curve rearwardly to form the A-frame configuration which has mounted at its upper end a rearwardly extending grapple support member which is generally perpendicular to the boom columns and carries thereon pivotal mounting means for the grapple mechanism. The grapple mechanism is pivotally mounted on the grapple support member and may be pivotally rotated about respective horizontal and vertical axes of rotation. When the grapple mechanism is pivotally rotated about its horizontal axis of rotation toward the grapple boom, mating brackets on the grapple mechanism and on the grapple support member become aligned when the grapple mechanism is finally rotated to a relatively parallel orientation with respect to the grapple support member. Openings in respective brackets are then aligned so that a pin may be inserted therethrough to hold the grapple mechanism in fixed relationship with respect to the grapple boom, with the arms of the grapple mechanism overlying the boom arms.

A built-in fairlead, comprising a main roller and two side rollers is disposed in the boom arch below the grapple mechanism so that the cable from the winch may be played out over the main roller without interfering with the pinned grapple mechanism when the vehicle operates as a cable skidder. To operate the vehicle as a grapple skidder, the cable is drawn up and the pin is released, permitting the grapple mechanism to freely pivot downward.

Although the present design configuration offers a simple method of transferring a boom configuration from a cable skidder mode to a grapple skidder mode easily and without removal of the grapple mechanism from the vehicle, substantial design modifications were required to achieve the desired result. The boom was designed to be sufficiently narrowed to accommodate the arms of the grapple mechanism thereabove when the vehicle is in the cable skidder mode, a suitable connection had to be provided between the boom and the grapple mechanism to retain the grapple mechanism in a suitable configuration for the cable skidder mode and the fairlead rollers had to be suitably mounted for compatible operation with the grapple in both the cable skidder and the grapple skidder modes of operation.

Thus, the present device, simple in its end result, required innovative engineering considerations and substantial modifications of existing designs to produce a grapple boom configuration which can be easily transferred from a grapple skidder mode of operation to a cable skidder mode of operation without connecting and disconnecting the grapple mechanism and the boom whenever the mode of operation is changed. These and other advantages will become more apparent when the following detailed description of the invention is considered with the drawings which are described below as follows.

DESCRIPTION OF THE PREFERRED EMBODIMENT

Figure 1:
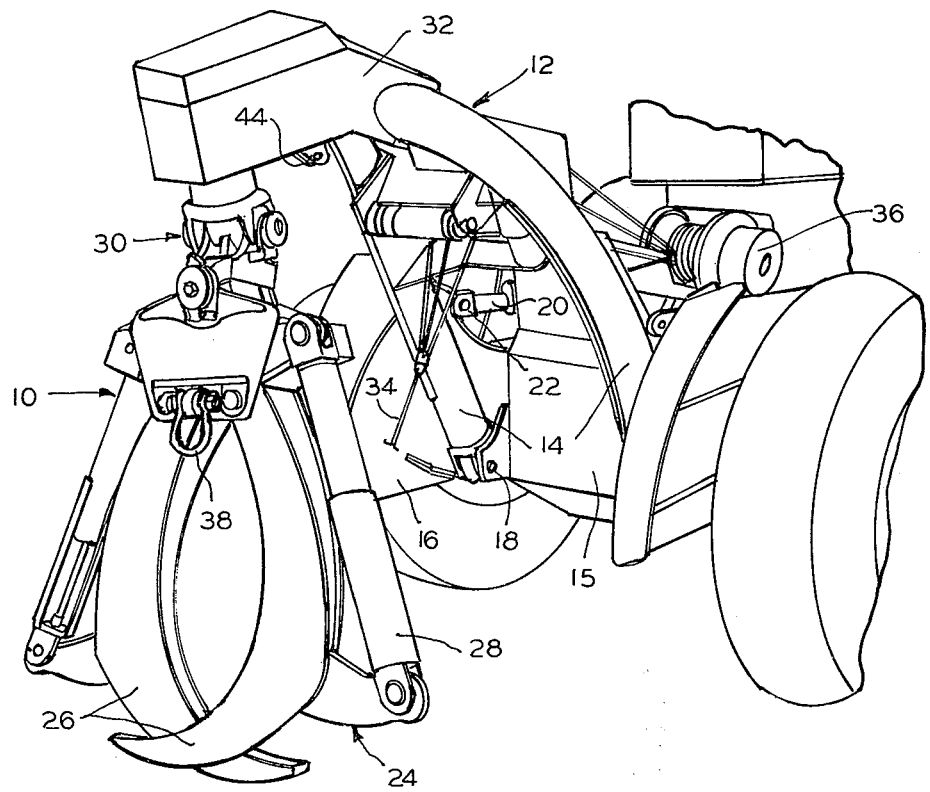
FIG. 1 is a rear perspective view of a skidder vehicle with a grapple boom assembly mounted thereon in the grapple skidder mode.

FIG. 1 is a rear perspective view of a grapple boom assembly 10 including a skidder boom 12 comprising a pair of columnar members 14, each pivotally mounted at the rear of the skidder frame 15 adjacent respective opposite skidder side frame skirts or fenders 16 at a lower pivotal mounting location 18. Boom support columns 14 extend upwardly and curve rearwardly from opposite sides of the skidder frame to converge into an A-frame configuration which extends rearwardly of the skidder frame 15 at its upper end and terminates in a grapple support member 32 which is relatively perpendicular to the skidder boom 12. Respective hydraulic cylinders 20 each pinned at one end to each boom support column 14 at location 22 and at the other end to the frame 15 rotate the grapple boom assembly 10 to permit a grapple mechanism 24 to engage piles of logs laying on the ground. The grapple mechanism 24 has opposing grapple arms 26 each controlled by respective hydraulic cylinders or snubbers 28 appropriately connected thereto. The grapple mechanism 24 is connected to the grapple support member 32 by a grapple pivot connection 30, which may be similar to the one described in U.S. Pat. No. 3,990,688 entitled "Grapple Skidder with Self-Centering Grapple Support Mechanism" issued Nov. 9, 1976 and assigned to the assignee of the present invention. The grapple pivot connection 30 permits the grapple mechanism 24 to pivot about respective horizontal and vertical axes.

Figure 2:
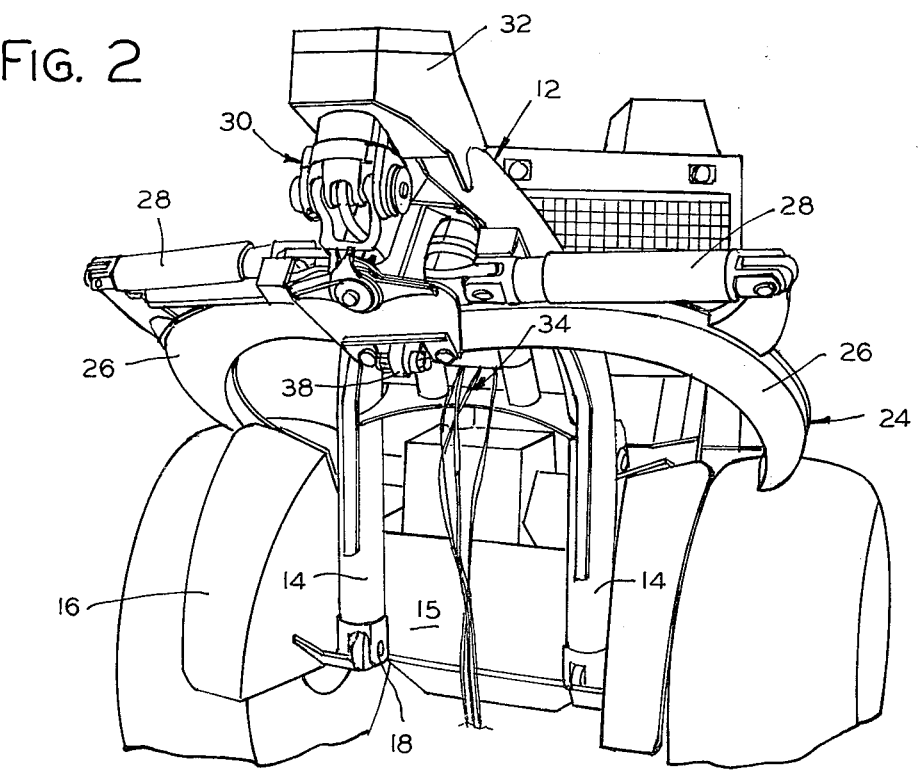
FIG. 2 is a rear perspective view of the grapple boom assembly of the present invention with the grapple mechanism partially rotated to a cable skidder mode.

As shown in FIG. 2, the unique configuration of the skidder boom 12 coordinated with its grapple support member 32 permits the grapple mechanism 24 to be rotated upwardly as follows. A cable 34 extending from winch 36 may be connected to a metal loop 38 provided on the grapple mechanism 24. Hydraulic cylinders 28 may be retracted to spread the grapple arms 26 apart and the winch 36 activated to draw the grapple mechanism 24 up toward the boom structure 12.

Figure 3:
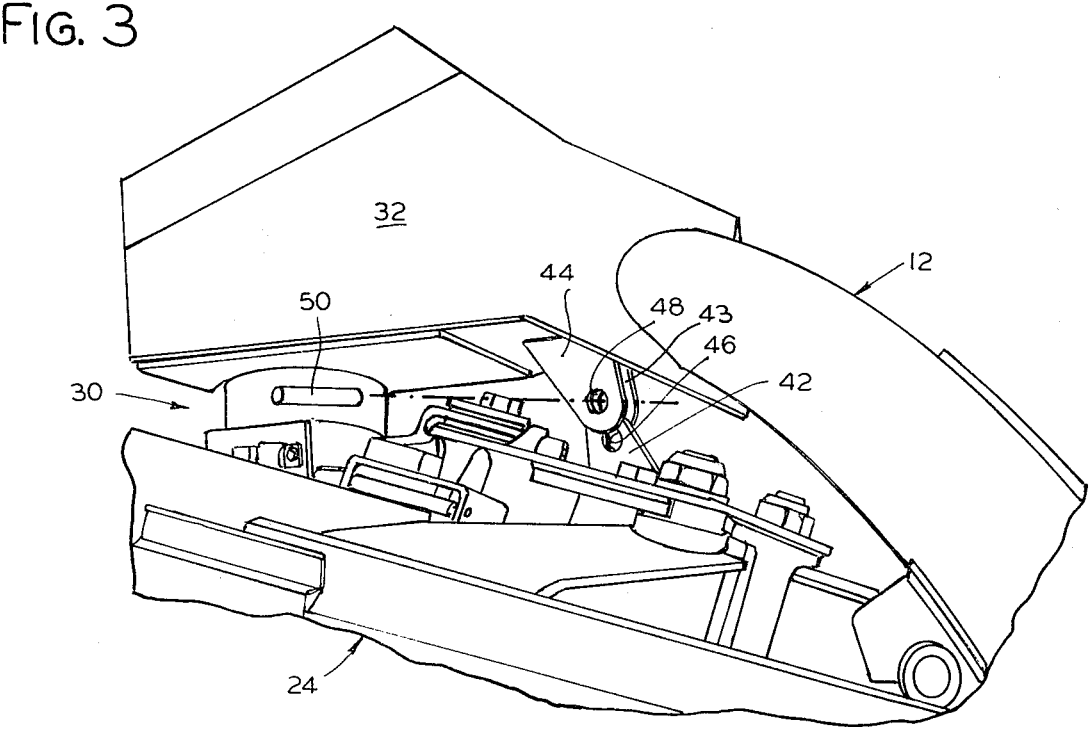
FIG. 3 is a detail view showing the grapple boom connection when the grapple mechanism is pivoted to the cable skidder mode.
Figure 4:
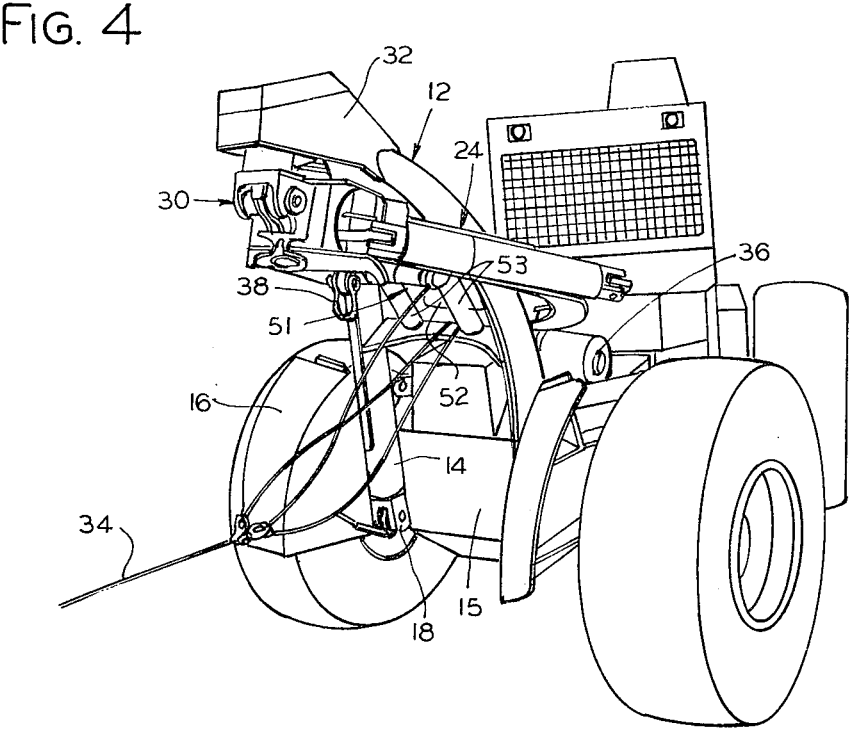
FIG. 4 is a rear perspective view of the skidder vehicle with the grapple boom assembly thereof having the grapple mechanism mounted in the cable skidder mode.

As shown in FIG. 3, as the grapple mechanism 24 is drawn up toward the boom 12, an extension plate or member 42 mounted on the grapple mechanism 24 engages a slot 43 in a clevis 44 mounted on the grapple support member 32. The grapple mechanism 24, when fully rotated, aligns respective openings 46 and 48 in the bracket 42 and the clevis 44 to receive a pin 50 which then holds the skidder boom 12 and the grapple mechanism 24 in the cable skidder mode of operation. Grapple cylinders 28 may then be extended to close the grapple arms 26 above the boom support columns 14 as shown in FIG. 4. The grapple boom assembly 10 comprises a built-in fairlead assembly 51 which includes a main cable roller 52 and a pair of side cable rollers 53 associated with the winch 36 and so mounted on the skidder boom 12 that they extend below the grapple assembly 10 when the grapple mechanism 24 is mounted in the cable skidder mode of operation enabling the cable 34 to play out below the grapple mechanism 24 and over the main horizontal roller guide 52 to easily enable the skidder vehicle to operate in a cable skidder mode without removal of the grapple mechanism 24.

Thus, the present invention offers a simple method of converting a skidder vehicle from a cable skidder mode to a grapple skidder mode without interchanging skidding booms and grapple booms or removing the grapple assembly from the skidder boom when a cable skidder mode of operation is desirable. This unique labor-saving feature has been effected by the innovative design of the present grapple boom configuration.

While the above detailed description sets forth a preferred embodiment of our invention, it should be understood that such description is for the purposes of illustration only and that various modifications and changes may be made in the above-described device without departing from the nature and the scope of the invention as set forth in the appended claims.

I claim:

1. An improved grapple boom assembly for a skidder vehicle adaptable from a grapple skidder configuration to a cable skidder configuration wherein the grapple boom assembly comprises a boom having a relatively narrow support base mounted on the rear of the frame of the skidder vehicle, the support base having grapple mounting means at its upper end for a grapple mechanism mounted thereon, the grapple mechanism having grapple arms associated therewith, the grapple mechanism being pivotable on the grapple mounting means so that a side portion of the grapple mechanism may engage a lower portion of the mounting means to effect a solid connection therebetween to retain the grapple mechanism in a relatively parallel configuration with the grapple mounting means, and the juxtaposition of the grapple mechanism and the boom permitting the skidder vehicle to operate in a cable skidder configuration.

2. An improved grapple boom assembly for a skidder vehicle adaptable from a grapple skidder configuration to a cable skidder configuration as claimed in claim 1 wherein the support base of the boom structure comprises a pair of columns converging upwardly to an A-frame configuration, the main body of the A-frame configuration being generally upright and curving rearwardly at the upper end thereof to carry the grapple mounting means which extend generally perpendicular from the main body of the A-frame configuration, the columns pivotally mounted on the vehicle frame and disposed between the rear wheels of the skidder vehicle, each column disposed adjacent respective skidder rear fenders at the inner sides thereof with hydraulic means disposed between the frame of the vehicle and respective columns to provide for pivotal movement of the grapple boom assembly.

3. An improved grapple boom assembly for a skidder vehicle adaptable from a grapple skidder configuration to a cable skidder configuration as claimed in claim 1 wherein the connection between the grapple mechanism and the grapple mounting means comprises a clevis mounted on the grapple mounting means engageable with a plate or member rigidly mounted on the grapple mechanism with complementary openings provided in the respective member provided so that when the openings are aligned, a pin may be inserted in place to hold the grapple mechanism and the grapple mounting means in fixed relation.

4. An improved grapple boom assembly for a skidder vehicle adaptable from a grapple skidder configuration to a cable skidder configuration as claimed in claim 1 wherein the grapple arms may be closed to overlie the boom arms of the grapple boom assembly when the grapple mechanism is secured in fixed relationship with the grapple mounting means.

5. An improved grapple boom assembly for a skidder vehicle adaptable from a grapple skidder configuration to a cable skidder configuration as claimed in claim 1 wherein the grapple boom assembly includes a built-in fairlead assembly providing a main roller and two side rollers for guiding the cable associated with a winch provided on the skidder vehicle for use when the vehicle is operating in the cable skidder mode, the fairlead assembly disposed below a mid-portion of the boom so that the fairlead is out of the way when the grapple mechanism and the grapple mounting means are juxtaposed to provide a cable skidder configuration.

6. An improved grapple boom assembly for a skidder vehicle adaptable from a grapple skidder configuration to a cable skidder configuration wherein the grapple boom assembly comprises a boom having a relatively narrow support base mounted on the rear of the skidder frame for the skidder vehicle and disposed between the rear wheels of the skidder and located inside skidder fenders adjacent the rear wheels of the skidder, a main portion of the support base extending generally upright and an upper portion thereof curving outwardly to accommodate grapple mounting means, the grapple mounting means being generally perpendicular to the main portion of the support base, a grapple mechanism pivotally mounted on the grapple mounting means, means provided between the grapple mechanism and the grapple mounting means so that a side portion of the grapple mechanism may engage a lower portion of the grapple mounting means to effect a solid connection between the grapple mechanism and the boom to retain the grapple mechanism in a relatively parallel configuration with the upper mounting means, the grapple mechanism having grapple arms which can close above the boom to retain the grapple mechanism in such parallel configuration, and the juxtaposition of the grapple mechanism and the boom by permitting the skidder vehicle to operate in a cable skidder configuration providing space below the grapple mechanism for the cables used in the cable skidder configuration of the vehicle to be extended outwardly.

7. A method for converting a skidder vehicle from a grapple skidder configuration to a cable skidder configuration, the method including the following steps:
   providing a grapple boom assembly having a relatively narrow boom pivotally mounted at the rear of the skidder vehicle;
   providing a grapple mechanism pivotable about a horizontal axis mounted on grapple mounting means provided on the grapple boom assembly;
   connecting a cable from a winch associated with the skidder vehicle to a loop provided on a grapple mechanism pivotally mounted on the grapple mounting means;
   activating the winch to draw up the cable and pivot the grapple mechanism about its horizontal axis to pivot the grapple mechanism upward toward the grapple mounting means carried on the end of the boom;
   connecting respective fixed means provided on the grapple mounting means and on the grapple mechanism to provide a solid connection therebetween; and
   closing grapple arms associated with the grapple mechanism to juxtapose the grapple arms above the boom arms of the improved grapple boom assembly to expose a fairlead assembly mounted on the boom structure and the cable associated therewith, so that the skidder vehicle can operate in a cable skidder mode.

* * * * *